March 3, 1936. P. L. ALGER 2,032,900
ARRANGEMENT FOR REDUCING TORSIONAL OSCILLATION OF MOTORS
Filed April 20, 1935
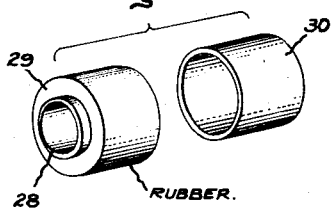
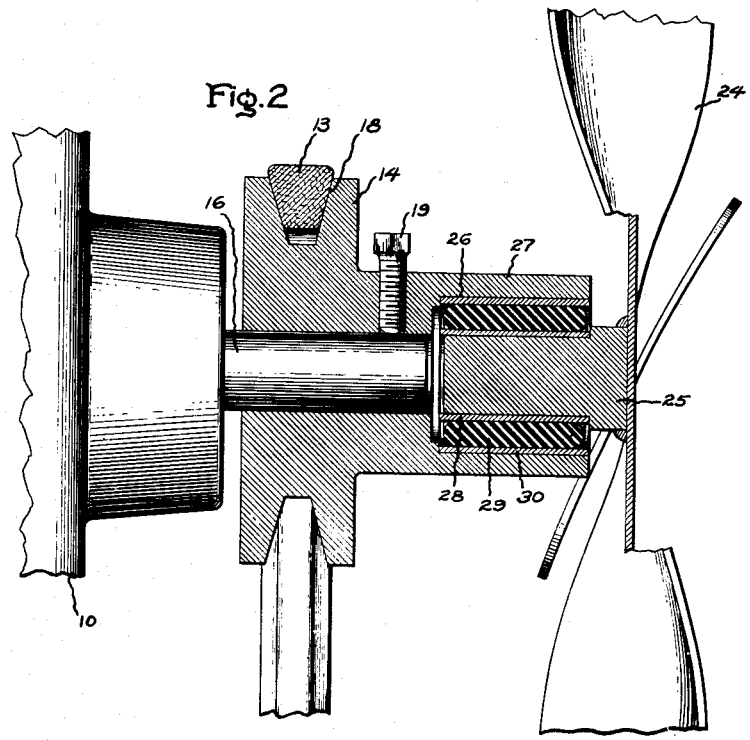
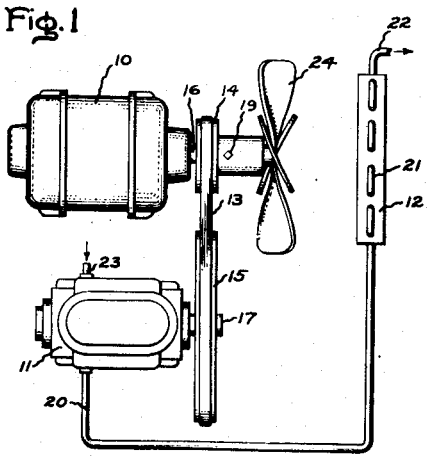
Inventor:
Philip L. Alger,
by Harry E. Dunham
His Attorney.

Patented Mar. 3, 1936

2,032,900

UNITED STATES PATENT OFFICE 2,032,900

ARRANGEMENT FOR REDUCING TORSIONAL OSCILLATION OF MOTORS

Philip L. Alger, Schenectady, N. Y., assignor to General Electric Company, a corporation of New York Application April 20, 1935, Serial No. 17,455

10 Claims. (Cl. 230—272)

My invention relates to an arrangement for reducing the amplitude of forced torsional oscillation to which the rotatable member of an electric motor is subjected when driving a pulsating load.

Refrigerating machines, for example, frequently include a reciprocating type refrigerant compressor, which may have one or more cylinders provided with reciprocating pistons therein, the compressor being driven by an electric driving motor through a belt. In such a machine, the reciprocating pistons of the compressor alternately suck gaseous refrigerant into their respective cylinders and compress the same. Thus, the force or torque required to drive the pistons fluctuates periodically depending upon the part of their stroke through which they are passing. As a consequence, a torque load is impressed on the rotor of the electric driving motor which fluctuates with a substantially constant periodicity during each revolution thereof. Such a fluctuating load imposes a torsional oscillation on the shaft and rotor of the driving motor. This forced torsional oscillation is undesirable since it frequently reaches such proportions as to cause the motor to draw a similarly fluctuating current from its electric supply line. This supply line is ordinarily used to supply incandescent lamps, or the like, and the fluctuations in current caused by the fluctuating load on the motor results in flickering of the lamps at a frequency visible to the eye, thus seriously impairing their usefulness as a source of illumination.

It is an object of my invention to provide an apparatus for reducing the amplitude of a forced torsional oscillation imposed on the rotatable member of an electric motor. I accomplish this object by utilizing a cooling fan as an inertia member, which is arranged to oscillate in such manner as to oppose the forces, which would otherwise cause the rotor of the motor to oscillate. Since a cooling fan is ordinarily employed in refrigerating apparatus for example, the desired results are obtained with a minimum amount of change in the conventional apparatus and by utilizing the minimum number of parts.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing, in which Fig. 1 is a plan view of a refrigerating apparatus embodying my invention; Fig. 2 is a fragmentary view, partly in section, of the cooling fan and mounting therefor included in the refrigerating apparatus shown in Fig. 1; and Fig. 3 is an exploded perspective view of the resilient mounting for the cooling fan, shown in Figs. 1 and 2.

Referring to the drawing, I have shown in Fig. 1 a refrigerating apparatus including an electric driving motor 10, a two-cylinder reciprocating type compressor 11 driven by the motor, and an air cooled condenser 12 to which compressed gaseous refrigerant is supplied by the compressor 11. The finned coil condenser 12 is arranged at the pulley end of the motor 10. The electric driving motor 10 drives the refrigerant compressor 11 by a V-type belt 13 arranged on pulleys 14 and 15 on the motor and compressor shafts 16 and 17, respectively. The motor shaft 16 is supported horizontally and the rotor of the motor is rigidly mounted thereon. The motor pulley 14 is provided with a peripheral V-shaped groove 18 adapted to receive the V-type belt 13 and is secured to the motor shaft 16 by a set screw 19. The compressor pulley 15 is also provided with a peripheral V-shaped groove and is rigidly secured to the compressor shaft 17. Gaseous refrigerant compressed in the motor driven compressor 11 is discharged therefrom through a conduit 20 through which it flows through the finned coil type air cooled condenser 12. The compressed gaseous refrigerant passing through the coils 21 of the condenser 12 is cooled by the cooling air circulating over the surfaces thereof, and is liquefied thereby. The refrigerant liquefied in the condenser 12 is discharged therefrom through an outlet 22 which is connected to a refrigerant evaporator, or the like. Vaporized refrigerant is returned from the evaporator to the inlet 23 of the compressor 11. This refrigerating apparatus, described above, is provided with a cooling fan 24 which circulates cooling air over the surfaces of the condenser 12, the electric motor 10, and also over the refrigerant compressor 11 which is of the air cooled type.

In accordance with my invention, the cooling fan 24 is utilized by resiliently mounting the same to minimize the torsional oscillations of the rotor of the electric motor 10, which would otherwise be imposed thereon by the pulsating torque of the refrigerant compressor 11. In the construction illustrated, the cooling fan 24 is resiliently mounted on the shaft 16 of the motor 10 and the resilient mounting therefor is preferably arranged in such manner that the natural frequency of oscillation of the fan on the resilient mounting is slightly above the frequency of the forced torsional oscillation imposed on the motor shaft. In order to resiliently mount the cooling fan 24 on the motor shaft 16, the fan is provided with a cylindrical hub 25 which is mounted by a series of concentric cylindrical bushings 28, 29 and 30 in a cylindrical bore 26 formed in the outer end of an integral extension 27 on the motor pulley 14. The cylindrical bushing 29 is made of resilient material, such as rubber. The inner bore of the rubber bushing 29 is bonded by vulcanization to the exterior of the cylindrical bushing 28 which is preferably made of steel, or the like. The inner diameter of the cylindrical bushing 30, which is made of steel or the like, is preferably smaller than the outside diameter of the rubber bushing 29. The bushing 30 is force-fitted on the bushing 29 so that the latter is compressed within the bushing 30. The inner bushing 28 is then force-fitted on the hub 27 of the fan 24 and the whole assembly is then mounted on the motor pulley 14 by force-fitting the outer bushing 30 in the bore 26 formed in the extension 27 of the motor pulley. I prefer to use a mounting of this type in which the rubber bushing 29 is held in radial compression since the resulting structure is thereby given a greater rigidity with respect to radial displacement, while at the same time the torsional flexibility is increased. It is also preferable to force-fit the bushing 29 in the outer bushing 30, rather than bonding the same thereto, in order that some slippage may occur in case of excessive torsional strain.

The electric driving motor 10 has a low inertia rotor and operates at a constant speed, which ordinarily approximates 1750 R. P. M. for domestic refrigerating machines. It is desirable to utilize a motor having a relatively low inertia rotor in order to improve the starting characteristics thereof. I prefer to utilize an arrangement in which the moment of inertia of the fan is made of the same order of magnitude as that of the motor rotor since the operation thereof is less sensitive to changes in the frequency of the forced torsional oscillations imposed on the rotor with respect to the natural frequency of the resiliently mounted fan 24 than when the moment of inertia of the fan 24 is small as compared to the moment of inertia of the rotor of the motor 10. When the frequency of the forced torsional oscillation imposed on the motor rotor is exactly equal to the natural frequency of the fan 24, the latter would theoretically set up exactly equal and opposite forces which would completely eliminate any torsional oscillation of the rotor. In actual practice, this perfection is not quite attained in view of the frictional damping effect of the rubber in the bushing 29. When the frequency of the forced torsional oscillations imposed on the rotor is substantially less than the natural frequency of the fan 24, that is 20% to 25% less, for example, the fan 24 will have very little effect in reducing the amplitude of oscillation of the rotor. On the other hand, if the frequency of the forced torsional oscillations is greater than the natural frequency of the fan 24, the resilient mounting of the latter will actually intensify the forced torsional oscillations of the motor rotor as compared to the oscillations thereof with a rigidly mounted fan. The refrigerant compressor 11 and the electric driving motor 10 ordinarily operate at relatively constant speeds, and as a consequence the frequency of the forced torsional oscillations imposed on the rotor of the motor 10 is relatively constant. Hence, the natural frequency of the fan 24 may be adjusted in design to a value closely approximating the desired relation to the forced torsional frequency of the oscillations of the rotor.

There are usually variations in motor and compressor speeds, however, encountered in normal operation due to variations in the voltage and frequency of the supply current when an alternating current motor is used, variations in compressor load and variations in motor resistance due to heating, and the like. As a consequence, I have found it desirable to adjust the natural frequency of the fan 24 to a value of from 3% to 15% above the frequency of the forced torsional oscillations imposed on the rotor of the motor 10 at its normal operating speed in order to be assured that the frequency of the forced torsional oscillations will always be less than the normal frequency of the fan 24 despite any variations in motor and compressor speed encountered during normal operation, as described above.

While I have shown a particular embodiment of my invention in connection with refrigerating apparatus, I do not desire my invention to be limited to the particular construction shown and described and I intend, in the appended claims, to cover all modifications within the spirit and scope of my invention.

What I claim as new and desire to secure by Letters Patent of the United States is:

1. In combination, an electric motor provided with a rotatable member subjected to forced torsional oscillation of substantially constant frequency during the normal operation thereof, a cooling fan for said motor, and means for resiliently mounting said cooling fan on said rotatable member and for utilizing said cooling fan for reducing the amplitude of oscillation of said rotatable member, said cooling fan having a natural frequency of torsional oscillation with respect to said rotatable member slightly above said constant frequency of said forced torsional oscillation.

2. In combination, an electric motor provided with a rotatable member subjected to forced torsional oscillation of substantially constant frequency during the normal operation thereof, a cooling fan for said motor, and means for resiliently mounting said cooling fan on said rotatable member and for utilizing said cooling fan for reducing the amplitude of oscillation of said rotatable member said cooling fan having a natural frequency of torsional oscillation with respect to said rotatable member of from 3% to 15% above said constant frequency of said forced torsional oscillation.

3. In combination, an electric motor provided with a rotatable member subjected to a forced torsional oscillation during the normal operation thereof, a cooling fan for said motor having a moment of inertia substantially equal to the moment of inertia of said rotatable member, and means for resiliently mounting said cooling fan on said rotatable member and for utilizing said cooling fan for reducing the amplitude of oscillation of said rotatable member.

4. In combination, an electric motor provided with a rotatable member subjected to forced torsional oscillation of substantially constant frequency during the normal operation thereof, a cooling fan for said motor having a moment of inertia substantially equal to the moment of inertia of said rotatable member, and means for resiliently mounting said cooling fan on said rotatable member and for utilizing said cooling fan for reducing the amplitude of oscillation of said rotatable member, said cooling fan having a natural frequency of torsional oscillation with respect to said rotatable member slightly above said constant frequency of said forced torsional oscillation.

5. In combination, an electric motor provided with a rotatable member subjected to forced torsional oscillation of substantially constant frequency during the normal operation thereof, a cooling fan for said motor having a moment of inertia substantially equal to the moment of inertia of said rotatable member, and means for resiliently mounting said cooling fan on said rotatable member and for utilizing said cooling fan for reducing the amplitude of oscillation of said rotatable member, said cooling fan having a natural frequency of torsional oscillation with respect to said rotatable member of from 3% to 15% above said constant frequency of said forced torsional oscillation.

6. In combination, an electric motor provided with a rotatable member subjected to forced torsional oscillation of substantially constant frequency during the normal operation thereof, means carried by said rotatable member for providing an axial cylindrical bore in the outer end thereof, means including a fan for circulating cooling air over the surfaces of said motor, said cooling fan having a moment of inertia substantially equal to the moment of inertia of said rotatable member, said cooling fan being provided with a hub in axial alignment with said rotatable member and extending into said bore means including a rubber bushing surrounding said hub for resiliently mounting said hub of said cooling fan in said bore and for utilizing said cooling fan to reduce the amplitude of torsional oscillation imposed on said rotatable member, said cooling fan having a natural frequency of torsional oscillation with respect to said rotatable member of from 3 to 15% above said constant frequency of said forced torsional oscillation.

7. A refrigerating machine comprising a reciprocating type refrigerant compressor, an electric driving motor provided with a rotor including a shaft, means including a belt for connecting said shaft and said compressor in driving relation, said compressor subjecting said rotor to forced torsional oscillation during the normal operation thereof, an air cooled condenser, means including a cooling fan for circulating cooling air over the surfaces of said condenser, and means for resiliently mounting said cooling fan on said motor shaft and for utilizing said cooling fan to reduce the amplitude of torsional oscillation imposed on said rotor and shaft by said compressor, said fan having a natural frequency of oscillation slightly less than the frequency of said forced torsional oscillation.

8. A refrigerating machine comprising a reciprocating type refrigerant compressor, an electric driving motor provided with a rotor including a shaft, means including a belt for connecting said shaft and said compressor in driving relation, said compressor subjecting said rotor to forced torsional oscillation during the normal operation thereof, an air cooled condenser, means including a cooling fan for circulating cooling air over the surfaces of said condenser, and means including a rubber bushing for resiliently supporting said cooling fan on said shaft and for utilizing said cooling fan to reduce the amplitude of torsional oscillation imposed on said rotor and shaft by said compressor, said fan having a natural frequency of oscillation slightly less than the frequency of said forced torsional oscillation.

9. A refrigerating machine comprising a reciprocating type refrigerant compressor, an electric driving motor provided with a rotor including a shaft means including a belt for connecting said shaft and said compressor in driving relation, said compressor subjecting said rotor to forced torsional oscillation during the normal operation thereof, an air cooled condenser, means including a cooling fan for circulating cooling air over the surfaces of said condenser, said cooling fan being provided with a hub in axial alignment with said shaft, and means including a rubber bushing surrounding said hub for resiliently mounting said cooling fan on said shaft and for utilizing said cooling fan to reduce the amplitude of torsional oscillation imposed on said rotor and shaft by said compressor, said fan having a natural frequency of oscillation slightly less than the frequency of said forced torsional oscillation.

10. A refrigerating machine comprising a reciprocating type refrigerant compressor, an electric driving motor provided with a rotor including a shaft, means including a pulley rigidly secured to said shaft and a belt passing over said pulley for connecting said shaft and said compressor in driving relation, said pulley being provided with a cylindrical bore in the outer end thereof in axial alignment with said shaft, said compressor subjecting said rotor to forced torsional oscillation during the normal operation thereof, an air cooled condenser, means including a cooling fan for circulating cooling air over the surfaces of said condenser and said motor, said cooling fan being provided with a hub in axial alignment with said shaft and extending into said bore, and means including a rubber bushing surrounding said hub for resiliently mounting said hub of said cooling fan in said bore and for utilizing said cooling fan to reduce the amplitude of torsional oscillation imposed on said motor by said compressor, said fan having a natural frequency of oscillation slightly less than the frequency of said forced torsional oscillation.

PHILIP L. ALGER.

CERTIFICATE OF CORRECTION.

Patent No. 2,032,900. March 3, 1936.

PHILIP L. ALGER.

It is hereby certified that error appears in the printed specification of the above numbered patent requiring correction as follows: Page 2, second column, line 53, claim 2, after "member" insert a comma; page 3, first column line 35, claim 6, after "bore" insert a comma; and second column, line 21, claim 9, after "shaft" insert a comma; and that the said Letters Patent should be read with these corrections therein that the same may conform to the record of the case in the Patent Office.

Signed and sealed this 21st day of April, A. D. 1936.

Leslie Frazer (Seal) Acting Commissioner of Patents.